(12) United States Patent
Jeong (10) Patent No.: US 10,676,135 B2
(45) Date of Patent: Jun. 9, 2020

(54) FRONT VEHICLE BODY REINFORCING STRUCTURE

(71) Applicants: HYUNDAI MOTOR COMPANY, Seoul (KR); KIA MOTORS CORPORATION, Seoul (KR)

(72) Inventor: Seung Min Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 62 days.

(21) Appl. No.: 15/993,139

(22) Filed: May 30, 2018

(65) Prior Publication Data

US 2019/0185065 A1 Jun. 20, 2019

(30) Foreign Application Priority Data

Dec. 15, 2017 (KR) .................. 10-2017-0173616

(51) Int. Cl.
*B62D 25/08* (2006.01)
*B62D 25/14* (2006.01)
(Continued)

(52) U.S. Cl.
CPC ........... *B62D 25/085* (2013.01); *B62D 21/02* (2013.01); *B62D 25/02* (2013.01); *B62D 25/04* (2013.01); *B62D 25/082* (2013.01); *B62D 25/14* (2013.01); *B62D 25/2018* (2013.01); *B62D 25/2045* (2013.01); *B60R 16/04* (2013.01)

(58) Field of Classification Search
CPC ...... B62D 25/085; B62D 25/14; B62D 25/04; B62D 25/2018; B62D 21/02; B62D 25/02; B62D 25/081; B62D 25/145; B62D 25/2045; B62D 27/02; B62D 25/147; B60R 16/04
See application file for complete search history.

(56) References Cited

U.S. PATENT DOCUMENTS 10,351,178 B2 * 7/2019 Han

FOREIGN PATENT DOCUMENTS

JP 2009-248585 A 10/2009
JP 6176228 B2 8/2017
(Continued)

*Primary Examiner* — D Glenn Dayoan
*Assistant Examiner* — Melissa Ann Bonifazi
(74) *Attorney, Agent, or Firm* — Morgan, Lewis & Bockius LLP (57) ABSTRACT

A front vehicle body reinforcing structure includes: a pair of front side members extending along a length direction of a vehicle and disposed on left and right sides of the vehicle in a width direction of the vehicle; a dash panel extending in the width direction and a height direction of the vehicle; a front pillar extending in the length direction and the height direction of the vehicle; a fender apron upper member disposed outside each of the pair of front side members in the width direction of the vehicle, extending along the length direction of the vehicle and connected to each of the pair of front side members, the dash panel, and the front pillar; and a first reinforcing member extending along the height direction of the vehicle, of which a first end portion is connected to the fender apron upper member and a second end portion is connected to a lower portion of the vehicle.

15 Claims, 9 Drawing Sheets

(51) Int. Cl.
  *B62D 25/04* (2006.01)
  *B62D 25/02* (2006.01)
  *B62D 25/20* (2006.01)
  *B62D 21/02* (2006.01)
  *B60R 16/04* (2006.01)

(56) References Cited

FOREIGN PATENT DOCUMENTS

| | | |
|---|---|---|
| KR | 10-1277861 B1 | 6/2013 |
| KR | 10-1488425 B1 | 2/2015 |

* cited by examiner

FRONT VEHICLE BODY REINFORCING STRUCTURE

CROSS-REFERENCE TO RELATED APPLICATION

This application claims priority to and the benefit of Korean Patent Application No. 10-2017-0173616 filed in the Korean Intellectual Property Office on Dec. 15, 2017, the entire contents of which are incorporated herein by reference.

TECHNICAL FIELD

The present disclosure relates to a front vehicle body structure, and more particularly, to a front vehicle body reinforcing structure that improves the reaction performance during a front overlap collision of a vehicle.

BACKGROUND

Generally, a front vehicle body is disposed at a front portion based on the longitudinal direction of the vehicle and includes a frame structure that forms an engine compartment. The front vehicle body includes a front end module which forms a front end of the engine compartment and a cooling module, a head lamp, etc., are installed therein. A front fender apron member forms both the left and right sides of the engine compartment and provides a space where a suspension system is disposed and wheels are installed. A dash panel is disposed behind the engine compartment and partitions a passenger compartment from the engine compartment.

Additionally, a front side member extending in a longitudinal direction of a vehicle is disposed under the engine compartment in left and right directions in a widthwise direction of a vehicle to provide reinforcement to the structural strength of the front vehicle body. A sub-frame for supporting an engine and a transmission installed in the engine compartment and a suspension system is disposed at the lower portion of the front side member in the height direction of the vehicle.

The front end portion of the front side member is mounted on a bumper beam extended in the width direction of a vehicle to improve the front collision performance. The bumper beam is connected with the front end portion in the length direction of the vehicle through a crash box.

In particular, when a vehicle having a front vehicle body with the above structure collides head-on with small overlap with a collision object such as an obstacle or another vehicle during operation, (e.g., when a collision object such as a small overlap barrier deviated to one side along the width direction of the vehicle and collides with the outside portion of the vehicle body) the collision object displaces the front side member to collide with the weak outer portion of the vehicle body. Accordingly, the vehicle does not effectively perform during a front small-overlap collision and the passenger safety is compromised and excessive collision damage of the vehicle body occurs.

In order to solve the above-described deficiencies, reinforcing the outer portion of a vehicle body to cope with a small overlap collision has been proposed.

For example, a structure having a front end portion of a front fender apron member extends to a front end portion of a front side member and connected to each other by a connecting member, a structure having a reinforcement member for preventing infiltration of a collision object is mounted on the outside of a front side member, or a structure for reinforcing a front pillar or a side sill have been proposed. However, the proposed structures have the drawbacks that include excessive increase in the weight and cost of the vehicle body and insufficient protection of the passenger during the small overlap collision.

On the other hand, in the case of the electric vehicle, since the large capacity battery is mounted on the floor panel of the vehicle body, the vehicle body reinforcement due to the large capacity battery is structurally proposed, thereby failing to effectively cope with frontal collision and forward small overlap collision.

The above information disclosed in this Background section is only for enhancement of understanding of the background of the invention, and therefore, it may contain information that does not form the prior art that is already known in this country to a person of ordinary skill in the art.

SUMMARY

The present disclosure provides a front vehicle body reinforcing structure capable of effectively reducing the deformation of a dash panel by proper dispersion of the collision load in the frontal collision of a vehicle, preventing the vehicle from being excessively damaged by suppressing the rotational behavior and more effectively protecting the safety of the passenger by inducing the transverse direction behavior of the vehicle during a frontal small overlap collision of the vehicle.

A front vehicle body reinforcing according to an exemplary embodiment of the present disclosure may include: a pair of front side members extending along a length direction of a vehicle and provided in plural to be disposed on left and right sides along a width direction of the vehicle; a dash panel extending in the width direction and a height direction of the vehicle and dividing an engine compartment and an occupant compartment; a front pillar extending in the length direction and the height direction of the vehicle and connected to the dash panel; a fender apron upper member disposed outside each of the pair of front side members in the width direction of the vehicle, extending along the length direction of the vehicle and connected to each of the pair of front side members, the dash panel, and the front pillar; and a first reinforcing member extending along the height direction of the vehicle, of which a first end portion is connected to the fender apron upper member and a second end portion is joined to a lower portion of the vehicle.

A side lower member may be joined at the bottom of the dash panel, a side outer member may be joined to a side lower member, and the other end portion of the first reinforcing member may be joined to the side lower member and the side outer member.

The side lower member and the side outer member may form a U-shaped cross-section and the other end portion of the first reinforcing member may be inserted into the U-shape cross-section to join to the side lower member and the side outer member.

The first reinforcing member may be disposed on both the left and right sides of the width direction of the vehicle and the first reinforcing members on the left and right sides may be connected to each other through a second reinforcing member formed to extend along width direction of the vehicle.

A dash floor panel may be joined to the dash panel and the dash floor panel may be joined to a third reinforcing member formed to extend along the width direction of the vehicle.

The front side member may include a front side inner member arranged on the inside along the width direction of the vehicle and a front side outer member arranged on the outside along the width direction of the vehicle.

A fourth reinforcing member may be joined to the dash panel and the dash floor panel and both end portions of the fourth reinforcing member may be joined to the front side inner member.

The fourth reinforcing member may be formed in a C-shape.

The fourth reinforcing members may be disposed on both sides of the left and right sides and the fourth reinforcing members on the left and right sides may be connected to each other by the third reinforcing member.

A sub-frame mounting bracket for mounting a sub-frame may be joined to the front side inner member and the second reinforcing member may be joined to the front side inner member together the sub-frame mounting bracket.

The first reinforcing member may be inserted into a space formed by the front side inner member and the front side outer member and joined to the front side inner member and the front side outer member.

The side lower member may be interposed between the first reinforcing member the front side inner member to be joined to the first reinforcing member the front side inner member.

The front side outer member and the first reinforcing member may be joined to the dash floor panel.

A battery case may be mounted on the second reinforcing member.

The second reinforcing member may be joined to the front side inner member and the first reinforcing member.

A side sill formed to extend along the length direction of the vehicle may be further included and a side sill front member may be joined to the front end portion of the side sill along the length direction of the vehicle.

Both end portions of the side lower member may be connected to the side sill front member and the front side member, respectively.

In accordance with a front vehicle body reinforcing structure according to an exemplary embodiment of the present disclosure, in the event of a frontal or offset collision with an object during vehicle travels, the impact load is preferentially input to the front side member and the impact load input to the front side member is effectively dispersed to an upper part of the vehicle body via the fender apron upper member connected to the front side member.

Further, the load applied to the front side member is distributed to the front pillar and the side lower member by the cascade structure, so that the load transferred to the dash panel is reduced, thereby effectively reducing the deformation of the dash panel.

On the other hand, the load applied to the fender apron upper member is appropriately dispersed to the upper part of the roof, the second reinforcement member and the side lower member due to the cascading structure, so that the deformation of the dash panel can be effectively reduced.

On the other hand, in the forward small overlap of the vehicle, the collision load is distributed to the fender apron upper member and the front side member, and the cascading structure of the first, second, third, and fourth reinforcement members causes lateral movement of the vehicle body, thereby preventing excessive damage to the vehicle body and more safely protecting the passenger.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE EMBODIMENTS

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum). An exemplary embodiment of the present disclosure will now be described in detail with reference to the accompanying drawing.

Figure 1:
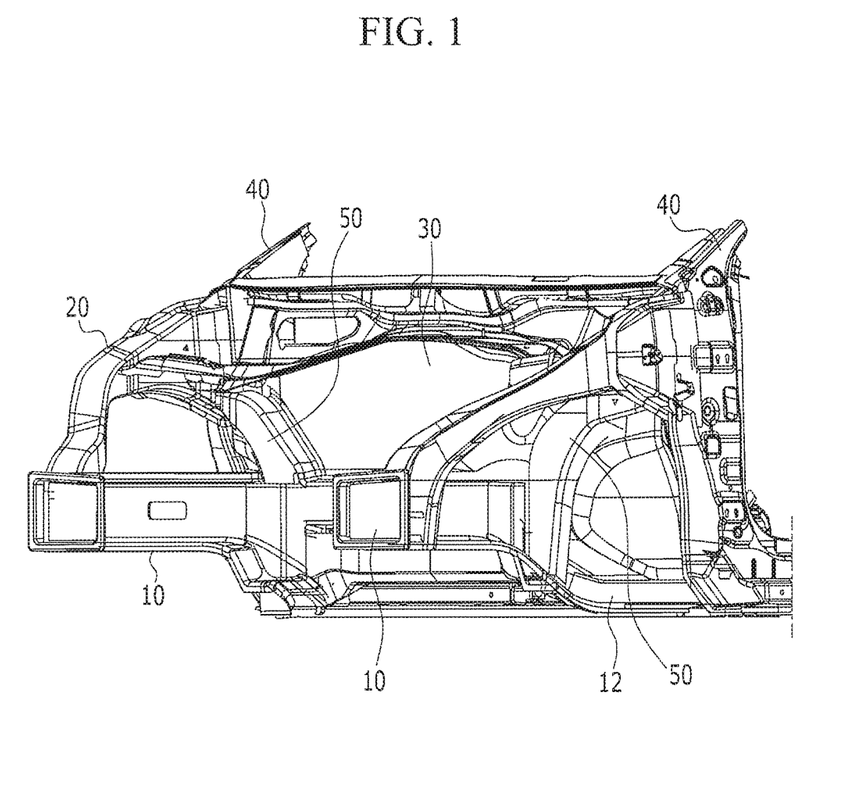
FIG. 1 is an exemplary perspective view of a front vehicle body reinforcing structure according to an exemplary embodiment of the present disclosure.
Figure 2:
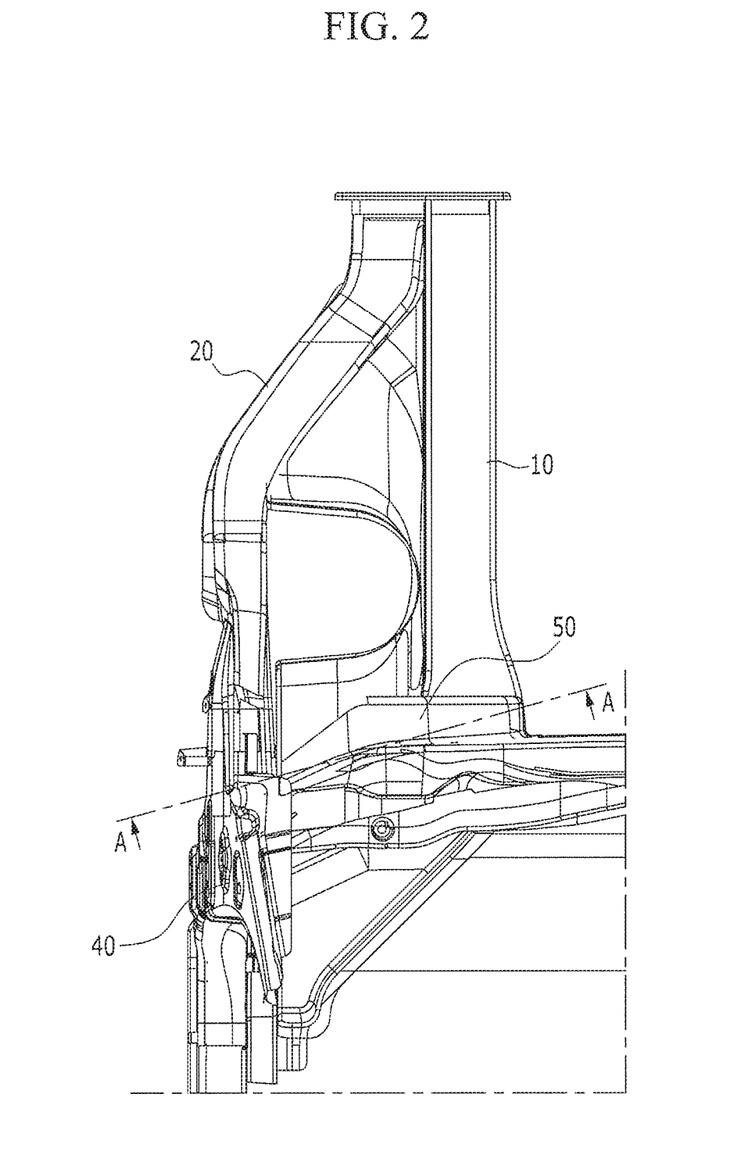
FIG. 2 is an exemplary top plan view of a part of the front vehicle body reinforcing structure according to an exemplary embodiment of the present disclosure.
Figure 3:
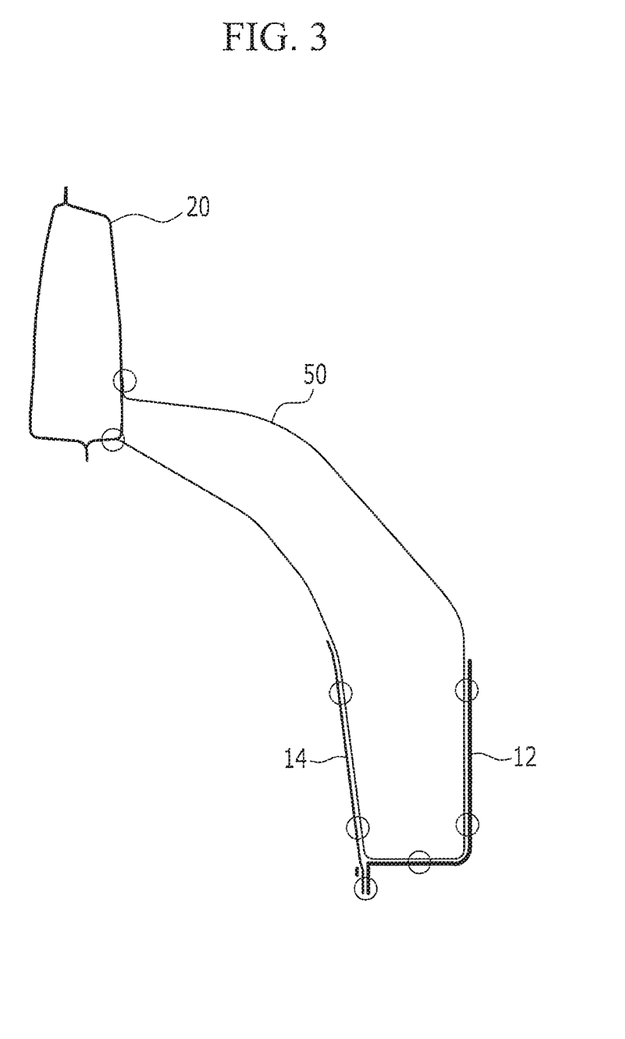
FIG. 3 is an exemplary A-A line cross-sectional view of FIG. 2 according to an exemplary embodiment of the present disclosure.

Referring to FIG. 1 to FIG. 3, a front vehicle body applied to a reinforcing structure according to an exemplary embodiment of the present disclosure may include a front side member 10 formed to extend in the length direction of a vehicle and disposed at both left and right sides along the width direction of the vehicle, a fender apron upper member 20 disposed outside the front side member 10 in the width direction of the vehicle and extending along the length direction of the vehicle to join to the front side member 10, and a dash panel 30 formed to extend in the width direction and height direction of the vehicle and compartmentalizing an engine compartment and an occupant compartment.

A front pillar 40 formed to extend in the length direction and the height direction of the vehicle may be coupled to the dash panel 30, and the fender apron upper member 20 may be joined to the dash panel 30 and the front filler 40.

A side lower member 12 may be joined to the lower end portion of the dash panel 30, a side outer member 14 may joined to the side lower member 12, and the side lower member 12 and the side outer member 14 may form a substantially U-shaped cross-section.

In the exemplary embodiment of the present disclosure for reinforcing the front vehicle body structure, a first reinforcing member 50 may further be provided. The first reinforcing member 50 may extend in the height direction of the vehicle. An end portion of the first reinforcing member 50 may be joined to the fender apron upper member 20 and the other end portion thereof may be inserted into the U-shaped cross-section to join the side lower member 12 and the side outer member 14.

The first reinforcing member 50 may be disposed on both the left and right sides along the width direction of the vehicle to connect the fender apron upper member 20, the side lower member 12, and the side outer member 14.

By connecting the fender apron upper member 20 of the upper vehicle body and the side power member 12 and the side outer member of the lower vehicle body via the first reinforcing member 50 (hereinafter, referred to as a Cascading structure), the connecting rigidity between the upper vehicle body and the lower vehicle body is increased, thereby effectively dispersing the input load to the vehicle body.

Figure 4:
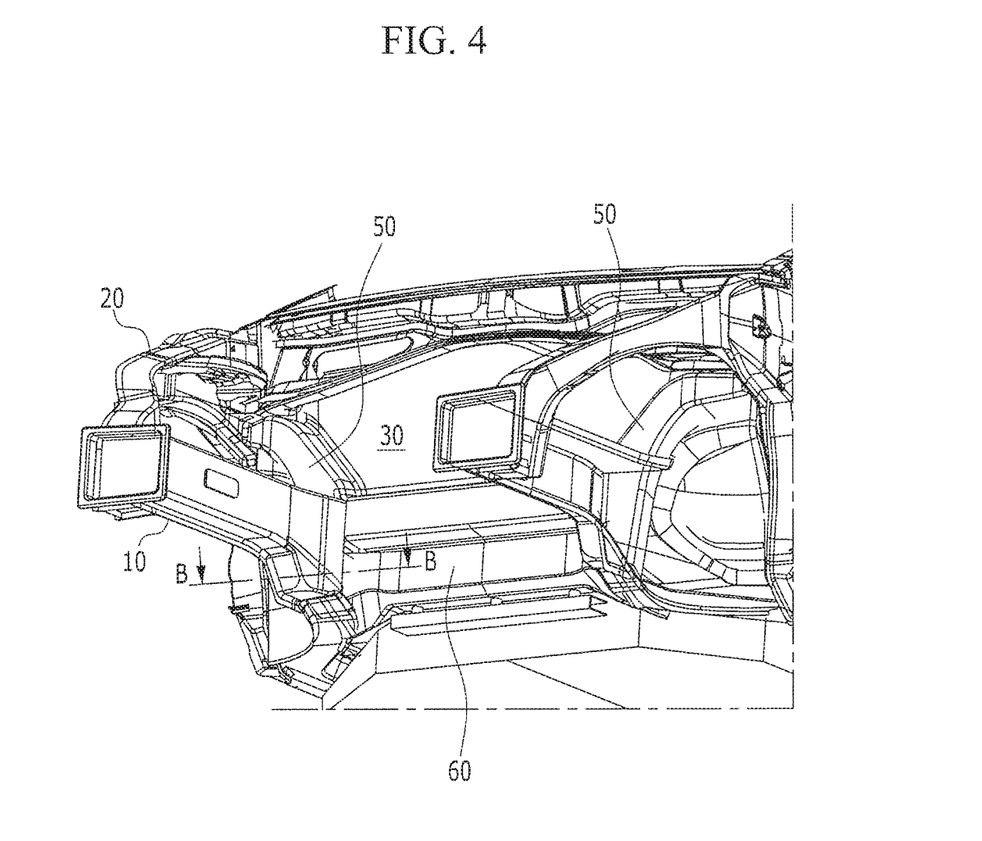
FIG. 4 is an exemplary perspective another view of a front vehicle body reinforcing structure according to an exemplary embodiment of the present disclosure.
Figure 5:
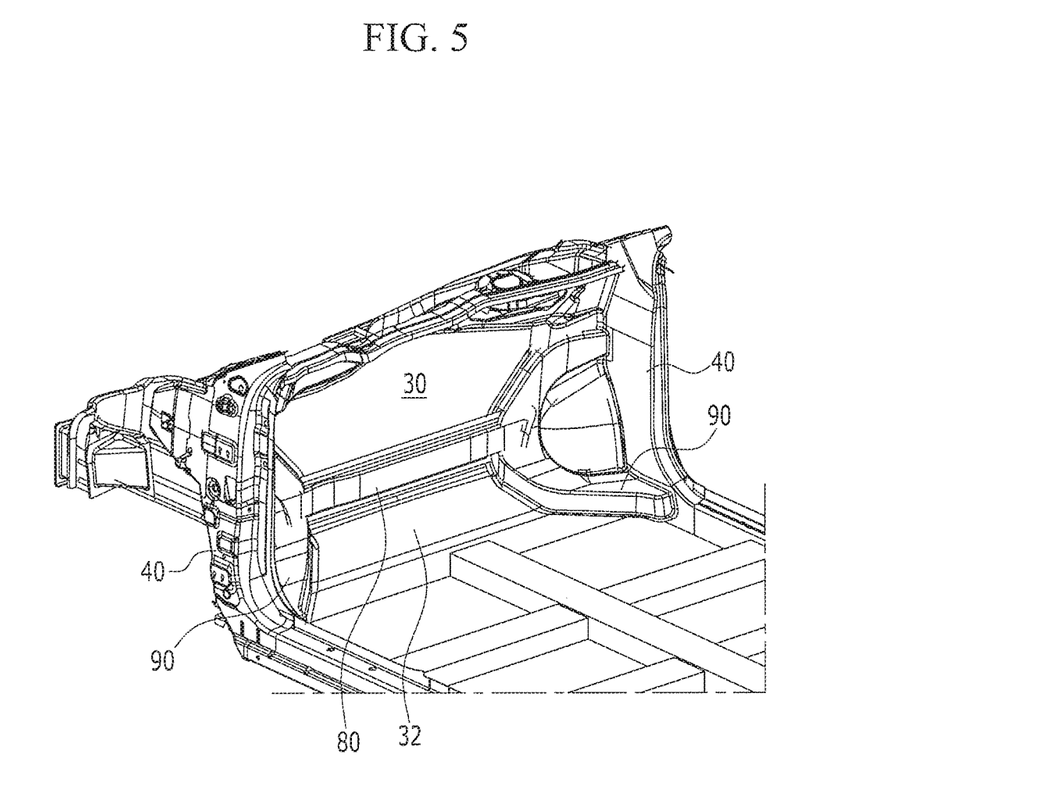
FIG. 5 is an exemplary perspective view viewed from a passenger compartment of a front vehicle body reinforcing structure according to an exemplary embodiment of the present disclosure.
Figure 6:
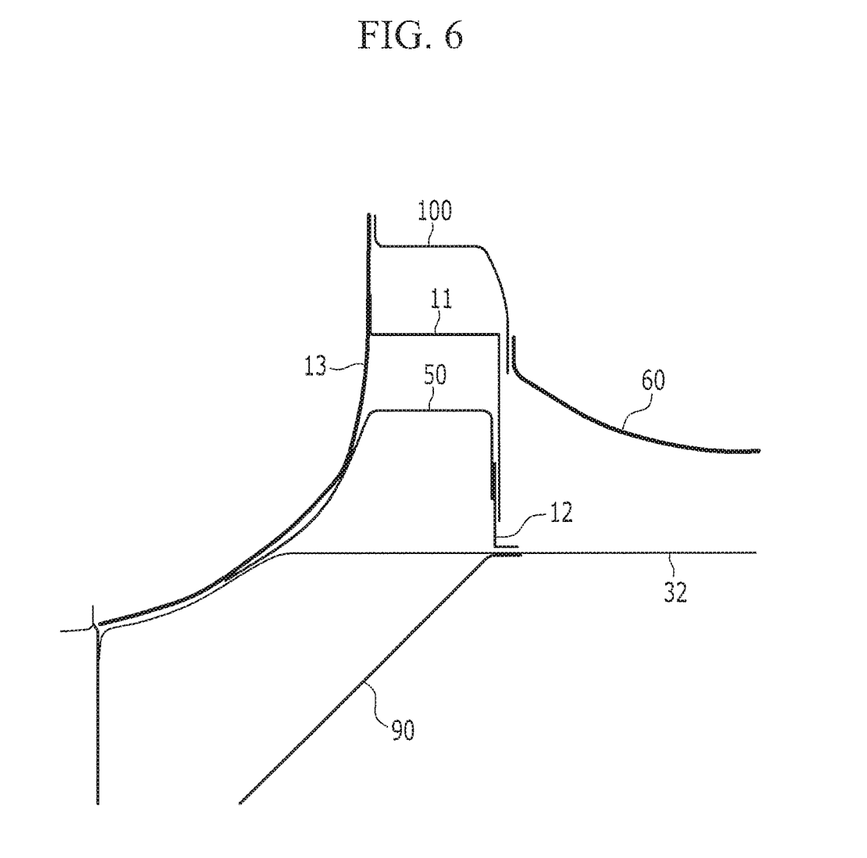
FIG. 6 is an exemplary B-B line cross-sectional view of FIG. 4 according to an exemplary embodiment of the present disclosure.

Referring to FIG. 4 to FIG. 6, the lower portions of the first reinforcing members 50 on both the left and right sides may be connected to each other through a second reinforcing member 60.

That is, both end portions of the second reinforcing member 60 may be joined to both side surfaces facing each other of the lower portions of the first reinforcing members 50 on both the left and right sides.

By connecting the first reinforcing members 50 on both the left and right sides through the second reinforcing member 60, the up-down and left-right rigidity of the vehicle body may be increased and the large capacity battery case 70 may be attached to the second reinforcing member 60 to increase the mounting rigidity of the large capacity battery.

Further, a third reinforcing member 80 extending along the width direction of the vehicle may be joined to a dash floor panel 32 continuously joined to the dash panel 30.

The front side member 10 may include a front side inner member 11 positioned on the inner side along the width direction of the vehicle and a front side outer 13 positioned on the outer side along the width direction of the vehicle. A fourth reinforcing member 90, which is substantially C-shape, may be joined to the front side inner member the dash panel 30 and the dash floor panel 32. Both end portions of the fourth reinforcing member 90 may be joined to the front side inner member 11.

The fourth reinforcing member 90 may be arranged on both the left and right sides. The fourth reinforcing member 90 on both left and right sides may be connected to each other through the third reinforcing member 80.

That is, both end portions of the third reinforcing member 80 may be joined to the fourth reinforcing members 90 on the left and right sides so that the fourth reinforcing members 90 on the left and right sides may be connected to each other through the third reinforcing member 80.

Since the fourth reinforcing member 90 may increase the rigidity of the dash panel 30 and the dash floor panel 32 to prevent the vehicle body from intruding into the occupant compartment in front or side collisions of the vehicle, it is possible to passengers more safely. The third reinforcing member 80 not only increases the lateral rigidity of the vehicle body like the second reinforcing member 60 but also connects the fourth reinforcing members 90 on both the left and right sides to effectively increase the front vehicle body rigidity.

Referring to FIG. 6, a sub-frame mounting bracket 100 for mounting a sub-frame at which the suspension system and so on is mounted may be joined to the front side inner member 11 and the second reinforcing member 60 may be joined to the front side inner member 11 together with the sub-frame mounting bracket 100.

The first reinforcing member 50 may be inserted into the space formed by the front side inner member 11 and the front side outer member 13 and may be joined to the front side inner member 11 and the front side outer member 13. The side lower member 12 may be interposed between the first reinforcing member 50 and the front side inner member 11 to be joined together. The front side outer member 13 and the first reinforcing member 50 may be joined to the dash floor panel 32 together.

Figure 7:
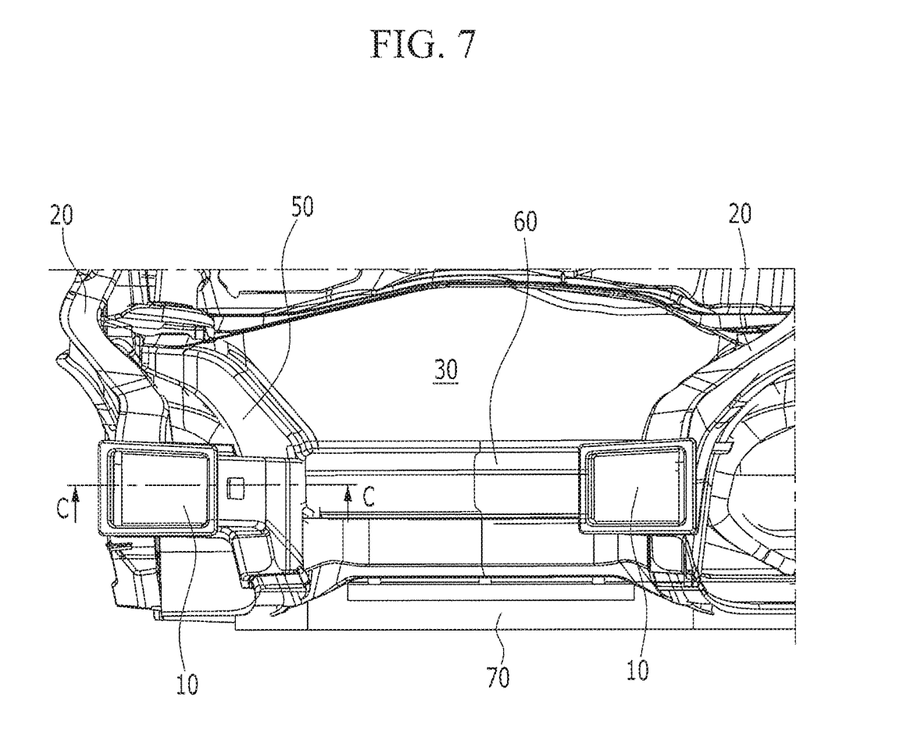
FIG. 7 is another exemplary perspective another view of a front vehicle body reinforcing structure according to an exemplary embodiment of the present disclosure.
Figure 8:
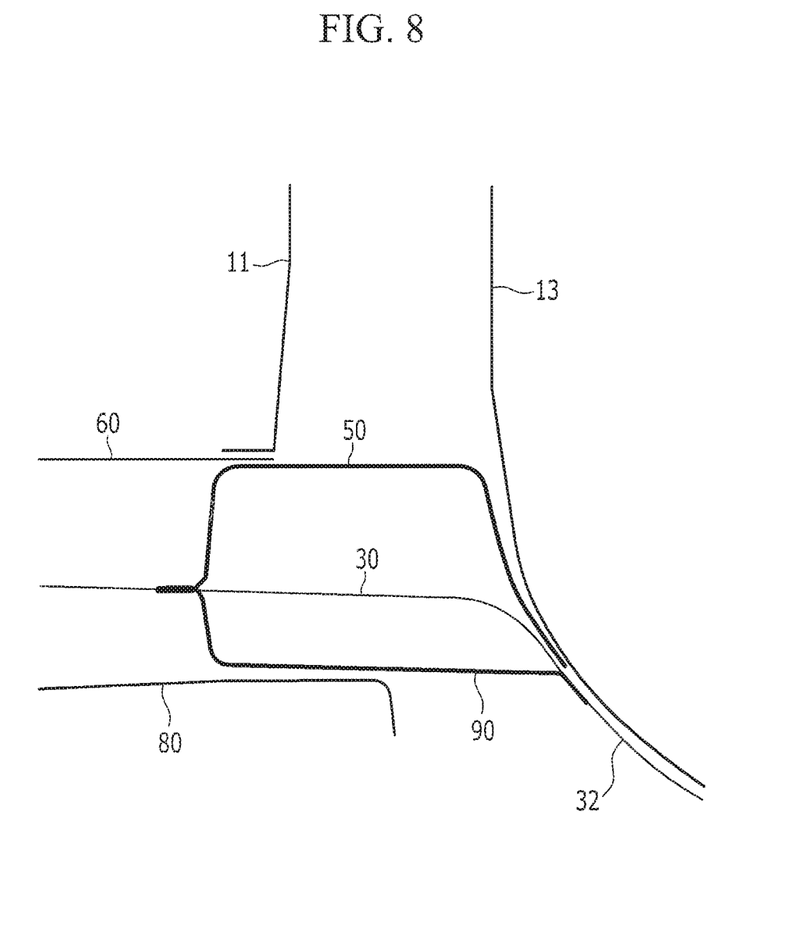
FIG. 8 is an exemplary C-C line cross-sectional view of FIG. 7 according to an exemplary embodiment of the present disclosure.

As shown in FIG. 7 and FIG. 8, when the battery case 70 is not directly mounted on the second reinforcing member 60, the second reinforcing member 60 may be positioned higher than the second reinforcing member 60 shown in FIG. 4 in the height direction of the vehicle so as to connect the first reinforcing members 50 on both the left and right sides.

In this case, the second reinforcing member 60 may be joined together with the front side inner member 11 and the first reinforcing member 50.

Figure 9:
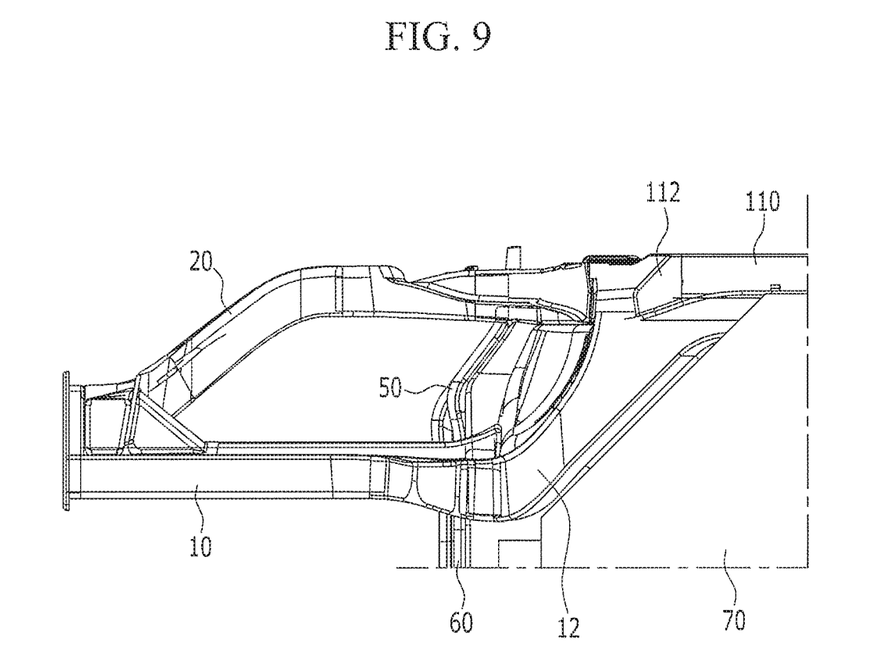
FIG. 9 is an exemplary lower perspective view of a part of the front vehicle body reinforcing structure according to an exemplary embodiment of the present disclosure.

Referring to FIG. 9, a side sill 110 may extend along the length direction of the vehicle and disposed on both sides along the width direction of the vehicle. A front end portion of the side sill 110 along the length direction of the vehicle may be joined to the side sill front member 112.

Both end portions of the side lower member 12 may be connected with the side sill front member 112 and the front side member 10, respectively, so that the longitudinal side rigidity along the length direction of the vehicle may be effectively increased and the penetration of the barrier and the tire into the occupant compartment may be inhibited at the time of a small overlap collision.

According to the front vehicle body reinforcing structure according to the present disclosure configured as described above, when the front collision or front small offset collision with the collision object occurs while the vehicle is traveling, the collision load is preferentially input to the front side member 10 and the collision load input to the front side member 10 is effectively dispersed to the upper part of the vehicle body via the fender apron upper member 20 connected to the front side member 10.

The load applied to the front side member 10 is dispersed to the front pillar 40 and the side lower member 12 by the cascading structure. Accordingly, the load transmitted to the dash panel 30 is reduced so that the deformation of the dash panel 30 may be reduced.

On the other hand, the load input to the fender apron upper member 20 is appropriately dispersed by the cascading structure to the upper portion of the roof, the second reinforcing member 60 and the side lower member 12, thereby effectively reducing deformation of the dash panel 30.

In addition, in the front small overlap collision of the vehicle, the impact load is distributed to the fender apron upper member 20 and the front side member 10, and the cascading structure formed by the first, second, third and fourth reinforcing members causes the vehicle body to behave in the lateral direction, thereby preventing excessive damage to the vehicle body and more safely protecting the occupants.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A front vehicle body reinforcing structure comprising:
   a pair of front side members extending in a length direction of a vehicle and disposed on left and right sides of the vehicle in a width direction of the vehicle;
   a dash panel extending in the width direction and a height direction of the vehicle and dividing an engine compartment and an occupant compartment;
   a front pillar extending in the length direction and the height direction of the vehicle and connected to the dash panel;
   a fender apron upper member disposed outside each of the pair of front side members in the width direction of the vehicle, extending along the length direction of the vehicle and connected to the pair of front side members, the dash panel, and the front pillar;
   a first reinforcing member extending along the height direction of the vehicle, of which a first end portion is connected to the fender apron upper member and a second end portion is connected to a lower portion of the vehicle;
   a side lower member connected to a bottom portion of the dash panel; and
   a side outer member connected to the side lower member,
   wherein the second end portion of the first reinforcing member is connected to the side lower member and the side outer member,
   wherein each of the side lower member and the side outer member has a U-shaped cross-section, and
   wherein the second end portion of the first reinforcing member is inserted into the U-shape cross-section to connected to the side lower member and the side outer member.

2. The front vehicle body reinforcing structure of claim 1, wherein the first reinforcing member is provided in pair and disposed on both of the left and right sides of the vehicle in the width direction of the vehicle, and
   wherein the pair of first reinforcing members on the left and right sides are connected to each other through a second reinforcing member which extends in the width direction of the vehicle.

3. The front vehicle body reinforcing structure of claim 2, further comprising a dash floor panel connected to the dash panel,
   wherein the dash floor panel is connected to a third reinforcing member which extends along the width direction of the vehicle.

4. The front vehicle body reinforcing structure of claim 3, wherein each of the pair of front side members comprises:
   a front side inner member disposed inside each of the pair of front side members along the width direction of the vehicle; and
   a front side outer member disposed outside each of the pair of front side members along the width direction of the vehicle.

5. The front vehicle body reinforcing structure of claim 4, further comprising a fourth reinforcing member connected to the dash panel and the dash floor panel,
   wherein end portions of the fourth reinforcing member are connected to the front side inner member.

6. The front vehicle body reinforcing structure of claim 4, wherein the fourth reinforcing member has a C-shape.

7. The front vehicle body reinforcing structure of claim 3, wherein the fourth reinforcing member is provided in pair and disposed on both sides of the left and right sides, and
   wherein the pair of fourth reinforcing members on the left and right sides are connected to each other by the third reinforcing member.

8. The front vehicle body reinforcing structure of claim 4, further comprising a sub-frame mounting bracket for mounting a sub-frame connected to the front side inner member,
   wherein the second reinforcing member is connected to the front side inner member together with the sub-frame mounting bracket.

9. The front vehicle body reinforcing structure of claim 4, wherein each of the pair of first reinforcing members is inserted into a space between the front side inner member and the front side outer member and is connected to the front side inner member and the front side outer member.

10. The front vehicle body reinforcing structure of claim 4, wherein the side lower member is interposed between and connected to each of the pair of first reinforcing members and the front side inner member.

11. The front vehicle body reinforcing structure of claim 4, wherein the front side outer member and each of the pair of first reinforcing members are connected to the dash floor panel.

12. The front vehicle body reinforcing structure of claim 2, further comprising a battery case mounted on the second reinforcing member.

13. The front vehicle body reinforcing structure of claim 4, wherein the second reinforcing member is connected to the front side inner member and each of the pair of first reinforcing members.

14. The front vehicle body reinforcing structure of claim 1, further comprising:
   a side sill extending along the length direction of the vehicle; and
   a side sill front member connected to a front end portion of the side sill along the length direction of the vehicle.

15. The front vehicle body reinforcing structure of claim 14, wherein end portions of the side lower member are connected to the side sill front member and each of the pair of front side members, respectively.

* * * * *